March 6, 1928.
E. R. WITZEL
1,661,208
LARGE AUTOMATIC GENERATING PLANT
Filed May 14, 1927
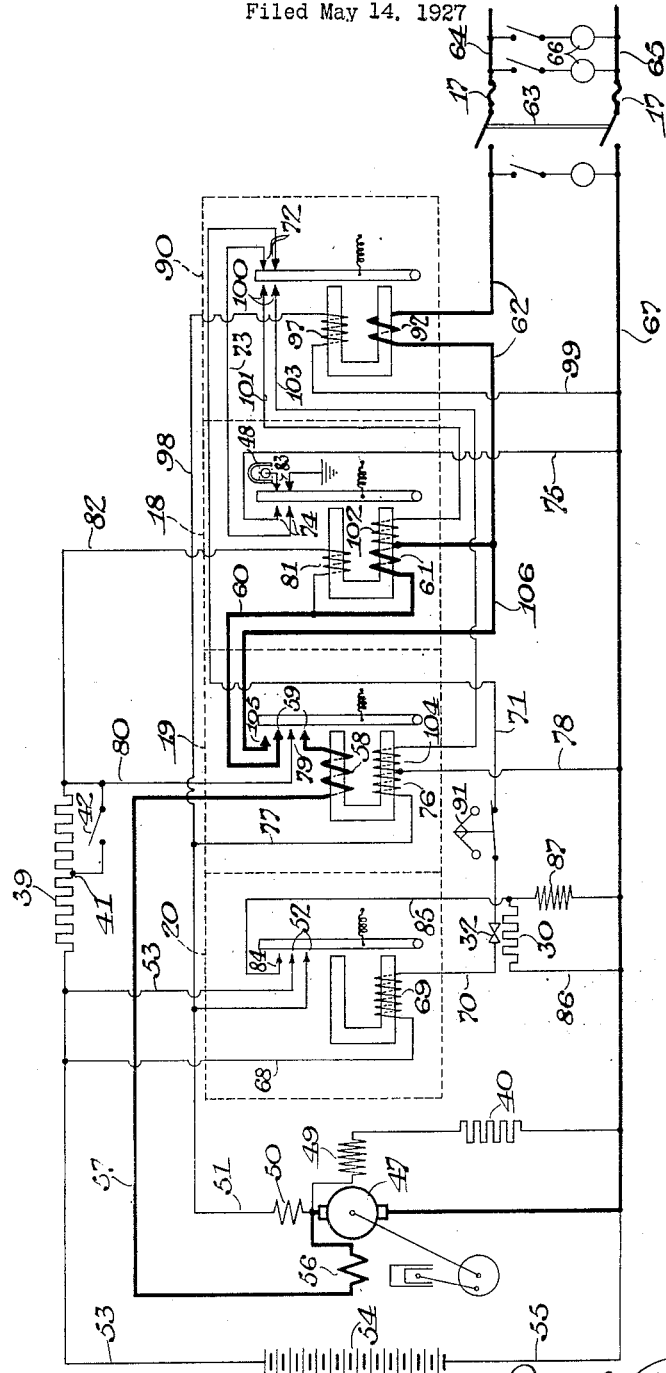
WITNESSES
Irving J. Rose
M. E. Downey
INVENTOR.
Earl R. Witzel
BY R. S. Caldwell
ATTORNEY.

Patented Mar. 6, 1928.

1,661,208

UNITED STATES PATENT OFFICE.

EARL R. WITZEL, OF KOHLER, WISCONSIN, ASSIGNOR TO KOHLER COMPANY, OF KOHLER, WISCONSIN, A CORPORATION OF WISCONSIN.

LARGE AUTOMATIC GENERATING PLANT.

Application filed May 14, 1927. Serial No. 191,421.

This invention relates to gas-engine-operated generating units of the demand starter type and has for its object to provide automatic switching mechanism designed particularly for the larger units (such as 3 or 10 k. w. capacity).

An object of the invention is to economize in the use of electric current in the switching mechanism, making it less expensive to operate than with switching mechanisms previously suggested.

Another object of the invention is to provide a switching mechanism with contacts of automatic switches closed in a positive manner so as to be free from vacillation or imperfect contact which render the operation uncertain and with unnecessary repetition of functions increasing the expense of operation and impairing the efficiency of the unit.

Another object of the invention is to make use as far as possible of the standardized automatic switching equipment of automatic generating units in general use of the small type (such as 1½ k. w. capacity).

With the above and other objects in view the invention consists in the large automatic generating plant as herein claimed and all equivalents.

Referring to the accompanying drawings, the figure constitutes a diagram of circuit connections of an automatic generating plant of the present invention.

In these drawings, the three magnetic switches usually employed for the automatic control of gas-engine-operated generators of low capacity (such as 1½ k. w.) are indicated by the reference characters 18, 19 and 20, respectively, the first of which is the control switch for starting and stopping the power plant in the presence or absence of a load on the mains, the second is the generator relay for connecting the generator with the line when the generator functions, and the third is the cranking switch for cranking the engine with the generator operating as a motor. The auxiliary switch for adapting such automatic switching mechanism to function for generator units of greater capacity (such as 3 or 10 k. w. or more) is indicated at 90 and the details of these switches will appear from further description thereof.

A series field 50 of the generator, effective when it is operated as a motor for cranking the engine, is connected by a wire 51 with one of the motor starting contacts 52 of the cranking switch 20, the other of said contacts being connected by a wire 53 with one terminal of the storage battery 54, the other terminal of which is connected by a wire 55 with the negative terminal of the generator to complete what is herein referred to as the cranking circuit.

The generator series field 56 is connected by a wire 57 to a series winding 58 of the generator relay 19, the other end of said winding being connected with one of the pair of contacts 59 of said relay, the other of which is connected by a wire 60 with one end of a series winding 61 of the control switch 18, the other end of which is connected by a wire 62 with one blade of the main knife switch 63, which connects it through one of the fuses 17 with one of the line wires 64, the other line wire 65 with the load indicated as lamps 66 between them being similarly connected through one of the fuses 17 and the other blade of the main knife switch with the wire 67 leading to the negative terminal of the generator. This constitutes what is herein referred to as the generator circuit.

The wire 68 leading from the positive battery terminal connects with one end of the winding 69 of the cranking switch 20, the other terminal of which is connected by wire 70 to one of the contacts 32 of the thermostatic switch, the other of said contacts being connected by a wire 71 including a governor switch 91 with one of the pair of back contacts 72 of the auxiliary switch 90, the other of which is connected by a wire 73 with one of the pair of contacts 74 of the control switch 18, the other of which contacts is connected by a wire 75 with the negative terminal of the battery, thus completing what is herein referred to as the cranking control circuit.

Another magnet winding 76 of the generator relay 19 forms a voltage coil across the terminals of the generator, but, for convenience, its circuit may be traced from one terminal of the generator through the series field winding 50, wire 51 and wire 77 to said winding 76 and from said winding through wire 78 to the other terminal of the generator.

For recharging the battery, which is preferably of lower voltage than the line voltage, such as a 24 volt battery on a 110 volt unit, there is a circuit controlled by the closing of the generator relay 19, from the positive terminal of the generator through series field 56, wire 57, coil 58, contacts 59 and 79, wire 80, battery-charging resistance 39, wire 53, battery 54, and wire 55, to the negative terminal of the generator. This is herein referred to as the battery-charging circuit and the rate of charge may be varied by the operation of the switch 42, which is connected between the tap clip 41 of the resistance unit 39 and the wire 80 so as to short circuit a part of the resistance.

Another winding 81 of the control switch 18 is of fine wire with many turns and is intended to be energized by the weak flow of current from the low voltage battery through the mains when a load circuit is closed while the generator is idle. The circuit through this winding 81 may be traced from the battery 54 through wire 53, resistance 39, wire 82, winding 81, wire 60, winding 61, wire 62, to line wire 64, and through the load 66 to line wire 65, and by way of wires 67 and 55 to the negative terminal of the battery.

In order that the power plant may cease operating when there is no load on the mains, the magneto 48 of the engine is grounded by a pair of back contacts 83 closed by the opening of the control switch 18.

The heating coil 30 of the thermostatic switch for disconnecting the contacts 32 of the cranking circuit when the engine fails to crank within a reasonable time, is in a circuit controlled by the cranking switch 20, which may be traced from the battery through wire 53, contacts 52 and 84, wire 85, heating coil 30 and wires 86 and 55 to the battery. Preferably there is also included in this circuit in parallel with the heating coil 30 a magnet coil 87 for operating a carbureter choke to assist in starting the engine.

In operation, with the power plant at rest, the automatic starting of the unit is accomplished by the closing of any load circuit on the mains. This causes the winding 81 of the control switch 18 to become energized, as above pointed out, to close said control switch, thereby removing the ground from the engine magneto 48 so that it may be operative and closing contacts 74 to establish the circuit through the winding 69 of the cranking switch 20. This causes the cranking switch to close and thereby close the cranking circuit from the battery through the generator, which operates as a motor to start the engine. As the engine comes up to speed the governor switch 91 opens the circuit through the cranking switch magnet 69 to interrupt the cranking circuit. When the generator functions it energizes the voltage coil 76 of the generator relay 19 and closes the generator relay switch, which connects the generator with the line by closing contacts 59. This operation also establishes the battery-recharging circuit by connecting contacts 59 with contact 79. The generator now supplies the line and, though the cranking switch 20 is open, the generator relay 19 and the control switch 18 remain closed, being held so by the action of the series holding coils 58 and 61 in the generator lead. This condition continues as long as the load remains on the line, but as soon as there is no load the current coil 61 releases the armature of the control switch 18, permitting it to close the magneto grounding contacts 18 to stop the engine.

The purpose of the holding coils 58 and 61 in series with the load is to retain these two switches 19 and 18 closed even upon the occurrence of an overload or short circuit, thus preventing the re-establishment of the cranking circuit and maintaining the control mechanism in the running condition long enough for the fuses 17 to blow to stop the operation of the power plant.

The circuits as thus described are thus relied on for the control of a generating unit of smaller capacity (such as 1½ k. w.), and, though they may be designed to control larger units, it is found desirable from the manufacturing standpoint and economical to standardize by the use of the same switching mechanism for larger generating units (such as 3 or 10 k. w. or larger) by providing an auxiliary relay to co-operate with the others in the proper automatic control of the heavier current flow.

This is accomplished by providing the auxiliary relay 90 having a series winding 92 in the main line lead 62 so as to carry the full load current and of such size wire as to be capable of carrying the full current strength of the generating unit. The other magnet winding 97 of auxiliary relay 90 forms a voltage coil across the terminals of the generator connected by wires 98 and 99 in parallel with the voltage coil 76 of generator relay 19 but incapable of itself of overcoming the spring of the relay armature. One of the pair of contacts 100 closed by the operation of the auxiliary relay 90 is connected by a wire 101 with one end of a winding 102 of the control relay 18, the other end of which connects with the positive terminal of the generator through line lead 60. The other of the contacts 100 is connected by a wire 103 with one end of a winding 104 of the generator relay 19, the other end of which connects with the negative terminal of the generator through wire 78. The closing of the auxiliary relay switch 90 thus places the two windings 102 and 104 in series with each other across the line so that they become voltage coils for the control relay 18 and the generator relay 19, respectively.

The function of the voltage coil 104 for the generator relay 19 is to increase the strength of its magnet and pull the armature beyond the position in which it engages contacts 59 and 79 to the position in which it also engages a stationary contact 105, the first mentioned contacts being yielding to permit of this position. The contact 105 is connected by a wire 106 with wire 62 so that the engagement of the armature with contact 105 short circuits the series coil 61 of the control relay 18 to avoid the waste of current when the load becomes of material value. This series winding 61 is of a comparatively large number of turns, inasmuch as it is relied on to hold the control relay 18 closed during light loads or until auxiliary switch 90 is closed. Its function of holding the control relay 18 closed is assumed by the voltage coil 102 energized as above described by the same operation of the auxiliary relay 90 which energizes the series coil 104 of the generator relay 19 to effect the short circuiting of series coil 61. Consequently the control relay 18 is not released by the operation of the auxiliary relay 90 but for load values above that for which the auxiliary relay is designed to operate the series coil 61 is short circuited and the voltage coil 102 is relied on to keep the control relay closed.

Although the values may be varied at will, in actual practice with a 110 volt generator unit of 10 k. w. capacity operating with a starting battery of 24 or 32 volts, the series coil 92 of the auxiliary relay may be designed to effect the closing of that relay with the assistance of the voltage coil 97 upon the load value reaching 7 amperes and permitting the release of the auxiliary relay switch upon the load value receding below 5 amperes. This insures against the series coil 61 being called upon to carry a greater current flow than 7 amperes, although the maximum current flow through series windings 58 and 92 may reach 100 amperes.

The placing of the back contacts 72 on the auxiliary relay 90 instead of on the generator relay 19 as heretofore is a matter of convenience, either location being suitable as, under heavy or overload conditions, the series windings of these relays prevent them from opening and so keep the back contacts open to prevent the closing of the cranking relay circuit regardless of the diminishing energy of their voltage coils.

What I claim as new and desire to secure by Letters Patent is:

1. In combination with the automatic control switching mechanism for gas-engine-operated generating units of the demand starter type having a control relay for starting and stopping the unit depending on a demand on the mains provided with a holding coil in series with the mains and effective for holding the control relay in its operated position during light loads, means sensitive to the load on the mains for short circuiting said holding coil, and a second holding coil on the control relay introduced by said means for holding the control relay in its operated position during heavy loads.

2. In combination with the automatic control switching mechanism for gas-engine-operated generating units of the demand starter type having a control relay for starting and stopping the unit depending on a demand on the mains provided with a holding coil in series with the mains, an auxiliary relay having a coil in series with the mains, means controlled by the auxiliary relay for short circuiting said holding coil, and a second holding coil on the control relay controlled by the auxiliary relay.

3. In combination with the automatic control switching mechanism for gas-engine-operated generating units of the demand starter type having a control relay for starting and stopping the unit depending on a demand on the mains provided with a holding coil in series with the mains and having a generator relay for connecting the generator with the mains in its operated position, means dependent upon the flow of current through the mains, a winding on the generator relay controlled by said means for moving the generator relay to a position beyond its operated position during heavy loads, a contact engaged by the generator relay in the last mentioned position thereof for short circuiting the holding coil of the control relay, and a second winding on the control relay controlled by said means for holding the control relay in its closed position during heavy loads.

4. In combination with the automatic control switching mechanism for gas-engine-operated generating units of the demand starter type having a control relay for starting and stopping the unit depending on a demand on the mains provided with a holding coil in series with the mains and having a generator relay for connecting the generator with the mains in its operated position, an auxiliary relay having a coil in series with the mains and having a coil connected across the terminals of the generator, a winding on the generator relay controlled by said auxiliary relay for moving the generator relay to a position beyond its operated position during heavy loads, a contact engaged by the generator relay in the last mentioned position thereof for short circuiting the holding coil of the control relay, and a second winding on the control relay controlled by the auxiliary relay for holding the control relay in its closed position during heavy loads.

In testimony whereof, I affix my signature.

EARL R. WITZEL.